(12) United States Patent
Fuchinoue et al.

(10) Patent No.: US 11,020,783 B2
(45) Date of Patent: Jun. 1, 2021

(54) MOLD HOLDER DEVICE AND PIPE MEMBER

(71) Applicant: AMADA HOLDINGS CO., LTD., Kanagawa (JP)

(72) Inventors: Yohei Fuchinoue, Kanagawa (JP); Seishiro Ikeda, Kanagawa (JP); Jun Kataoka, Kanagawa (JP)

( * ) Notice: Subject to any disclaimer, the term of this patent is extended or adjusted under 35 U.S.C. 154(b) by 121 days.

(21) Appl. No.: 16/094,702

(22) PCT Filed: Apr. 11, 2017

(86) PCT No.: PCT/JP2017/014779
§ 371 (c)(1),
(2) Date: Oct. 18, 2018

(87) PCT Pub. No.: WO2017/183514
PCT Pub. Date: Oct. 26, 2017

(65) Prior Publication Data
US 2019/0111461 A1    Apr. 18, 2019

(30) Foreign Application Priority Data

Apr. 19, 2016  (JP) .............................. JP2016-083423

(51) Int. Cl.
*B21D 5/02* (2006.01)
*B21D 37/14* (2006.01)
*F16B 19/00* (2006.01)

(52) U.S. Cl.
CPC ......... *B21D 5/0236* (2013.01); *B21D 5/0272* (2013.01); *B21D 37/14* (2013.01); *F16B 19/004* (2013.01)

(58) Field of Classification Search
CPC ...... B21D 5/02; B21D 5/0209; B21D 5/0236; B21D 5/0254; B21D 5/04
See application file for complete search history.

(56) References Cited

U.S. PATENT DOCUMENTS 3,227,030 A    1/1966  Preziosi et al.
3,630,261 A   12/1971  Gley et al.
(Continued)

FOREIGN PATENT DOCUMENTS

CN    103143944    6/2013
EP    0 446 810    9/1991
(Continued)

OTHER PUBLICATIONS

Machine translation of JPH10146617, Translated Nov. 13, 2019, 6 Pages. (Year: 1998).*
(Continued)

*Primary Examiner* — Gregory D Swiatocha
(74) *Attorney, Agent, or Firm* — Greenblum & Bernstein, P.L.C.

(57) ABSTRACT

A mold holder device in a press brake includes a mold clamp that clamps a mold with respect to a mold contacting surface provided for a holder body of the mold holder device. The mold clamp is pivotally arranged on the holder body. A long groove is formed in a mold clamping surface with which the mold clamp clamps the mold with respect to the mold contacting surface. The long groove is in parallel with a pivot axis of the mold clamp. A metal pipe member has a longitudinal slit and is inserted in a rotation restricted state into the long groove. A part of an outer peripheral surface of the pipe member is protruded toward the mold contacting surface.

9 Claims, 6 Drawing Sheets

(56) References Cited

U.S. PATENT DOCUMENTS

| | | | | |
|---|---|---|---|---|
| 5,390,527 A * | 2/1995 | Kawano | ............... | B21D 5/0209 |
| | | | | 72/462 |
| 6,263,721 B1 * | 7/2001 | Kawano | ............... | B21D 5/0209 |
| | | | | 72/462 |
| 6,516,649 B1 * | 2/2003 | Mika | ............... | B21D 5/0209 |
| | | | | 403/372 |
| 6,848,291 B1 * | 2/2005 | Johnson | ............... | B21D 5/0209 |
| | | | | 72/481.1 |
| 7,343,774 B2 * | 3/2008 | Gascoin | ............... | B21D 5/0209 |
| | | | | 72/462 |
| 9,555,456 B2 * | 1/2017 | Rogers | ............... | B21D 5/02 |
| 2002/0166360 A1 * | 11/2002 | Runk | ............... | B21D 5/0209 |
| | | | | 72/481.1 |
| 2004/0103710 A1 | 6/2004 | Gascoin et al. | | |
| 2005/0178183 A1 * | 8/2005 | Johnson | ............... | B21D 5/0209 |
| | | | | 72/482.2 |
| 2006/0174679 A1 * | 8/2006 | Pabich | ............... | B21D 5/0209 |
| | | | | 72/481.1 |
| 2009/0203453 A1 * | 8/2009 | Heinrich | ............... | F16D 1/0858 |
| | | | | 464/75 |

FOREIGN PATENT DOCUMENTS

| | | | | |
|---|---|---|---|---|
| JP | 62-20410 | | 5/1987 | |
| JP | 2-62119 | | 5/1990 | |
| JP | 10-146617 | | 6/1998 | |
| JP | 10146617 | A * | 6/1998 | ........... B21D 5/0236 |
| JP | 10-277647 | | 10/1998 | |
| JP | 2971013 | | 11/1999 | |
| JP | 2001-30010 | | 2/2001 | |
| JP | 2004-261866 | | 9/2004 | |
| WO | 98/22236 | | 5/1998 | |
| WO | 2005/080017 | | 9/2005 | |
| WO | 2013/161464 | | 10/2013 | |

OTHER PUBLICATIONS

Official Communication issued in European Patent Office (EPO) Patent Application No. 17785853.7, dated Mar. 21, 2019.

Office Action issued in Japan Counterpart Patent Appl. No. 2016-083423, dated Jun. 28, 2017, along with an English translation thereof.

Office Action issued in Japan Counterpart Patent Appl. No. 2016-083423, dated Oct. 24, 2017, along with an English translation thereof.

Official Communication issued in International Bureau of WIPO Patent Application No. PCT/JP2017/014779, dated Jul. 11, 2017.

Official Action in counterpart Chinese Patent Application No. 201780024009.8, dated Nov. 14, 2019.

* cited by examiner

MOLD HOLDER DEVICE AND PIPE MEMBER

TECHNICAL FIELD

The present invention relates to a mold holder device for holding a mold in a press brake and a pipe member used for the mold holder device, and more precisely, to a mold holder device capable of, when arranging, for example, a plurality of split molds adjacent to one another, evenly clamping the split molds and a pipe member used for the mold holder device.

BACKGROUND ART

When a press brake carries out a bending process on a plate-like work, split molds may be used as an upper mold and/or a lower mold. When using a plurality of the split molds, they may be set in a contiguous state and arranged in a single mold holder device.

Accordingly, when fixing the split molds by the mold holder device, it is preferred to fix them with an equal clamping force. Prior arts that may relate to the present invention are, for example, Patent Literatures 1 and 2.

PRIOR ART DOCUMENT

Patent Literature

Patent Literature 1: Unexamined Japanese Patent Application Publication No. 2001-30010

Patent Literature 2: Unexamined Japanese Patent Application Publication No. H10-146617

SUMMARY OF THE INVENTION

A mold holder stipulated in the Patent Literature 1 is a lower mold holder that is configured to push a mold with a mold pushing surface of a clamp plate to a mold contacting surface of a support body of the mold holder.

In this configuration, the mold pushing surface of the clamp plate is provided with a plurality of cylindrical support members at proper intervals along an entire left-right direction. The support members are provided with disk springs, respectively. Further provided are support covers that cover the disk springs and push the mold.

Accordingly, the configuration is complicated and it is difficult for the configuration to evenly push a plurality of molds with a stronger pushing force.

A mold holder stipulated in the Patent Literature 2 is an upper mold holder that is configured to have an elastic string of urethane resin and the like in a left-right direction groove formed in a movable plate for pushing an upper mold. It is difficult, therefore, to strongly and evenly push a plurality of upper molds with the elastic string.

In order to resolve the above-mentioned conventional problems, the present invention is characterized such that a mold holder device in a press brake includes a mold clamp that clamps a mold with respect to a mold contacting surface provided for a holder body of the mold holder device, the mold clamp being pivotally arranged on the holder body, a long groove that is formed in a mold clamping surface with which the mold clamp clamps the mold with respect to the mold contacting surface, the long groove being in parallel with a pivot axis of the mold clamp, and a metal pipe member that has a longitudinal slit and is inserted in a rotation restricted state into the long groove, a part of an outer peripheral surface of the pipe member being protruded toward the mold contacting surface.

Another characteristic of the mold holder device is that a pivot fulcrum serving as a pivot center when the mold clamp clamps the mold is arranged at a position where the mold clamp faces a front upper part of the holder body, as well as on a mold clamp surface of the mold clamp.

Another characteristic of the mold holder device is that the pipe member is divided into plural pieces.

Another characteristic of the mold holder device is that the long groove has an opening on the mold clamp surface, a vertical dimension of the pipe member arranged in the long groove is greater than a vertical dimension of the opening, and a long-groove-depthwise dimension of the pipe member is greater than a dimension from the mold clamp surface of the mold clamp up to a depthwise wall surface of the long groove.

Another characteristic of the mold holder device is that a sectional shape of the pipe member is noncircular and the slit of the pipe member in the long groove is positioned to face an upper surface, a lower surface, or a depthwise wall surface of the long groove.

The present invention is also characterized such that a pipe member being inserted into a long groove of a mold clamp pivotally arranged on a mold holder of a press brake includes a noncircular cross-sectional shape and is provided with a longitudinal slit at a position to face an upper surface, a lower surface, or a depthwise wall surface of the long groove when the pipe member is arranged in the long groove.

In accordance with the present invention, a mold clamp clamps a mold with respect to a mold contacting surface of a holder body. At this time, an outer peripheral surface of a metal pipe member inserted in a long groove of the mold clamp supplementarily pushes and fixes the mold with respect to the mold contacting surface of the holder body. Namely, an elastic deformation of the pipe member is used to supplementarily push and fix the mold with respect to the mold contacting surface. Accordingly, a plurality of molds can evenly be pushed and fixed.

DESCRIPTION OF EMBODIMENTS

Hereinafter, an embodiment of the present invention will be explained with reference to the diagrams.

Figure 1:
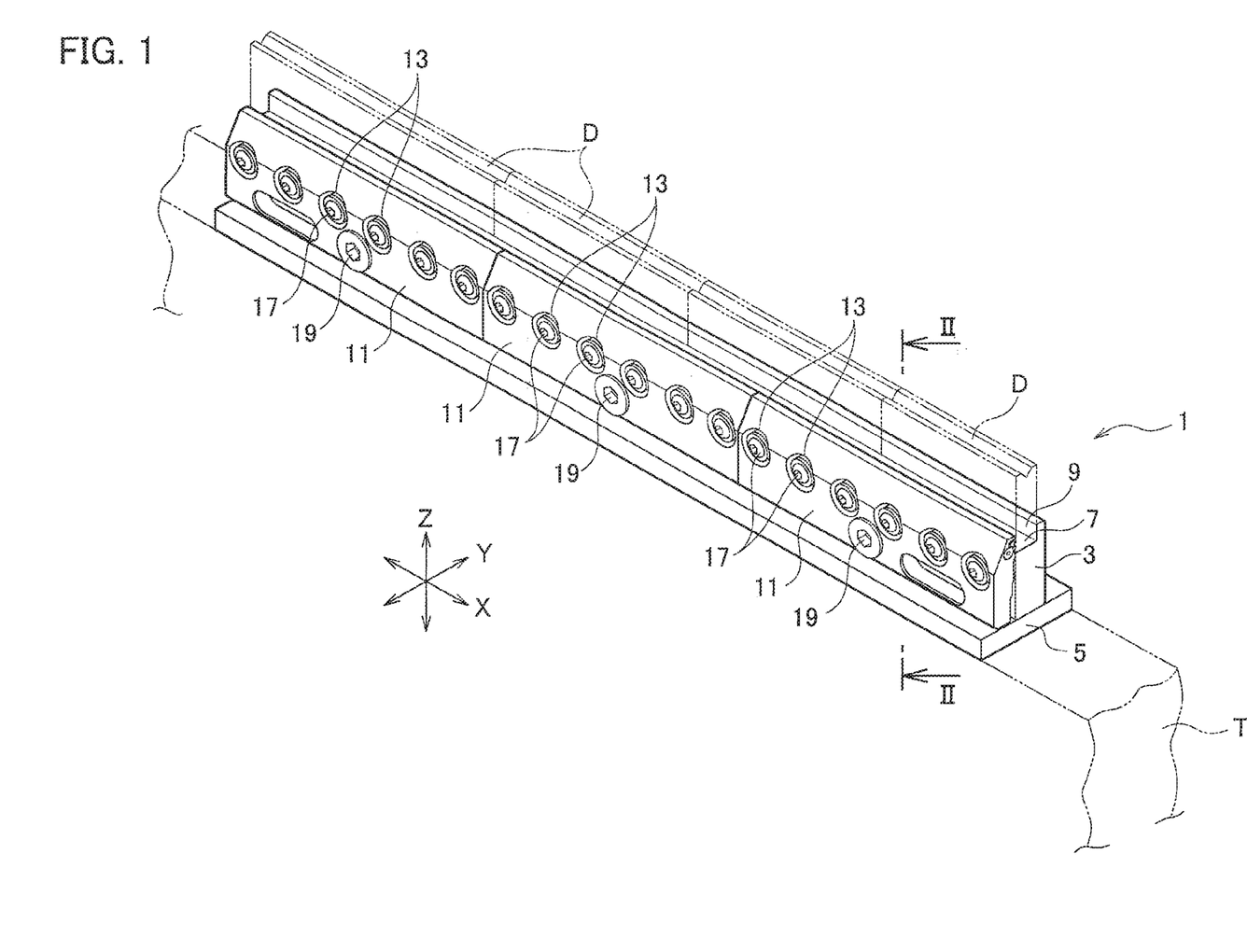
FIG. 1 is a perspective explanatory diagram showing a mold holder device according to an embodiment of the present invention.

FIG. 1 is a perspective explanatory diagram showing a mold holder device according to an embodiment of the present invention.

In FIG. 1, a mold holder device 1 that supports a plurality of lower molds (dies) D is shown as an example of a mold holder device in a press brake. In the press brake, upper molds (punches) are arranged to cooperate with the lower molds D to carry out a bending process on a plate-like work (not shown). Accordingly, the exemplarily shown mold holder device is properly modifiable to be employed as a mold holder for supporting upper molds.

As shown in FIG. 1, the mold holder device 1 has a holder body 3 that is attachable onto a lower table T of the press brake (not shown). The holder body 3 is attached through an integral holder base 5 onto the lower table T. The holder body 3 and holder base 5 are integrated together in advance, and therefore, the holder base 5 is deemed as a part of the holder body 3.

The holder body 3 is formed to extend in a left-right direction (X-axis direction). On a top surface of the holder body 3, there are formed a horizontal mold supporting surface 7 for supporting the lower molds D and a vertical mold contacting surface 9 that comes into contact with the lower molds D in a horizontal direction. Namely, the mold supporting surface 7 and mold contacting surface 9 are formed on planes that are orthogonal to each other.

Figure 2:
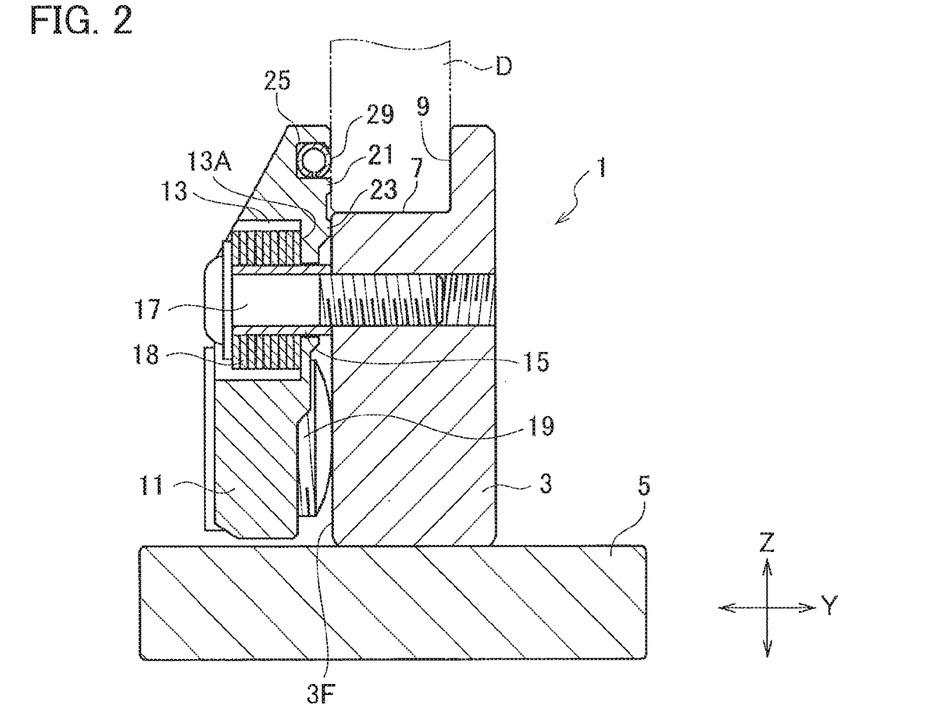
FIG. 2 is an enlarged sectional explanatory diagram taken along a line II-II of FIG. 1.

As shown in FIG. 2, a Y-axis-directional front surface 3F of the holder body 3 front-rear-pivotably supports a mold clamp 11 to clamp the lower mold D with respect to the mold contacting surface 9 of the holder body 3. The mold clamp 11 is formed, as shown in FIG. 1, to be shorter than the holder body 3. A plurality of the mold clamps 11 are lined up in the left-right direction on the holder body 3.

At a position higher than a middle height position in the vertical direction in each of the mold clamps 11, there is provided with a plurality of through holes 13 at proper intervals in the left-right direction. Pipe-like spacers 15 (refer to FIG. 2) are relatively pivotably passed through the through holes 13, respectively, and are in contact with the front surface of the holder body 3.

A resilient member 18 such as a disk spring is resiliently arranged between a head of a fastening screw 17 that is passed through the spacer 15 and is horizontally screwed and fixed to the holder body 3 and a bottom part 13A of the through hole 13. Accordingly, the mold clamp 11 is always pushed by a pushing force of the resilient members 18 toward the holder body 3. Also, the mold clamp 11 is supported so that it is slightly movable in the front-rear direction with respect to the fastening screws 17.

To pivot the mold clamp 11 in the front-rear direction, a pushing screw member 19 being movable in the front-rear direction is screwed into a lower part at a left-right central part of the mold clamp 11. A front end of the pushing screw member 19 is in contact with the front surface 3F of the holder body 3.

In a state that the front end of the pushing screw member 19 is in contact with the front surface 3F of the holder body 3, screwing the pushing screw member 19 into the mold clamp 11 results in slightly moving the mold clamp 11 in a left direction in FIG. 2 relative to the fastening screw 17, i.e., turning (pivoting) the mold clamp 11 in a clockwise direction. As a result, the lower mold D on the mold supporting surface 7 of the holder body 3 is pushed to the mold contacting surface 9.

The relative screwing of the pushing screw member 19 into the mold clamp 11 causes a mold clamp surface 21 at an upper part of the mold clamp 11 to push and clamp the lower mold D with respect to the mold contacting surface 9. For this, a support protrusion 23 is arranged to pivotally support the mold clamp 11.

Namely, in the mold clamp 11, the fulcrum protrusion 23 is formed on the mold clamp surface 21 that is above the fastening screw 17 and pushes and clamps the lower mold D with respect to the mold contacting surface 9. At a height position between the fastening screw 17 and the mold supporting surface 7 and at a height position to be in contact with the front surface 3F of the holder body 3, the fulcrum protrusion 23 is formed as a protruding strip in the left-right direction (X-axis direction). The mold clamp surface 21 of the mold clamp 11 to clamp the lower mold D with respect to the mold contacting surface 9 of the holder body 3 is provided with a left-right directional long groove 25 that is formed in a front end side of the mold clamp surface 21.

Figure 4:
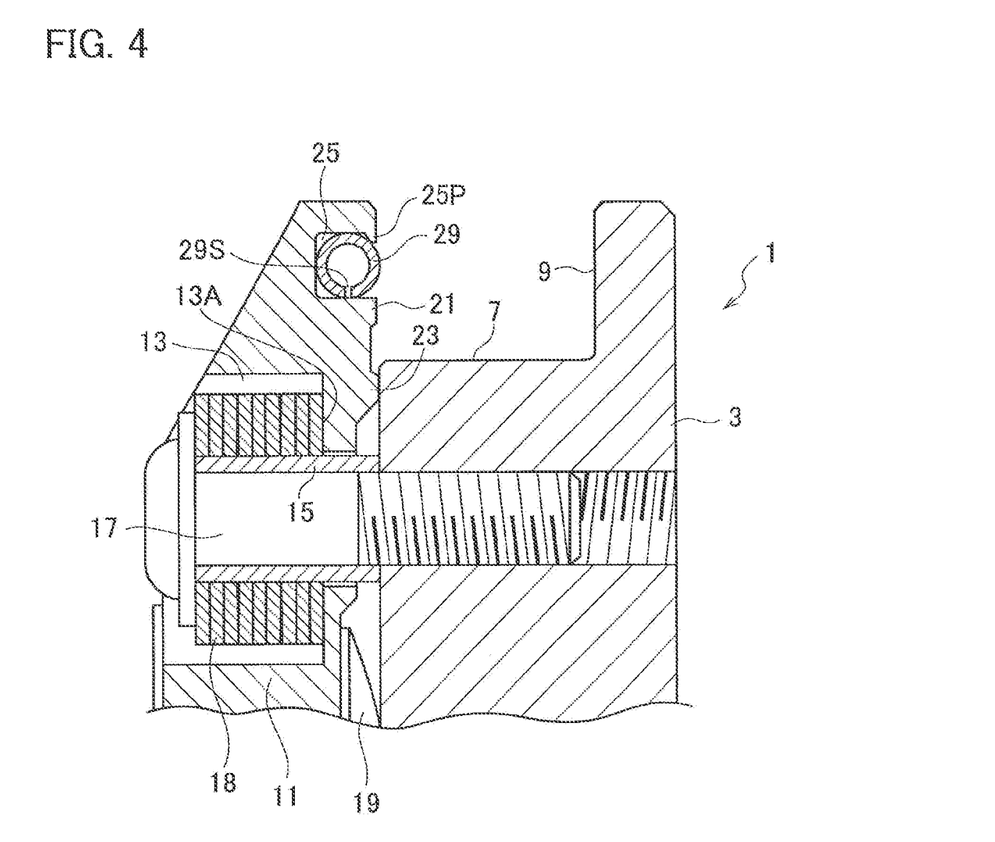
FIG. 4 is an enlarged diagram showing an essential part shown in FIG. 2.

The long groove 25 runs in parallel with a pivot center (rotation center) of the mold clamp 11 and opens, as shown in FIG. 4, in a direction facing the mold contacting surface 9. In the long groove 25, a plurality of pipe members 29 are inserted. The pipe members 29 are made of metal such as spring steel and stainless steel having a large elastic coefficient, and to allow an elastic deformation, each have a slit 29S in a longitudinal direction. At an opening 25A of the long groove 25, a protrusion 25P (refer to FIG. 4) is formed to prevent the pipe members 29 from falling off.

Figure 5:
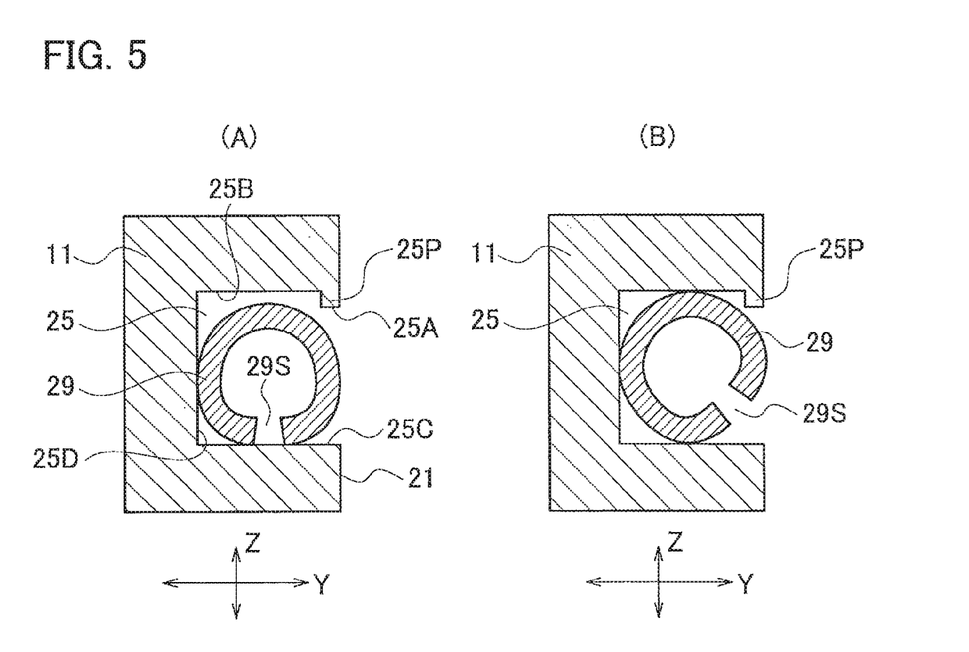
FIG. 5 is an operation explaining diagram schematically showing a state in which a pipe member is inserted in a long groove of the mold clamp.

The pipe members 29 are inserted in the long groove 25 such that they are rotation-restricted not to turn in the long groove 25. Namely, as schematically shown in FIG. 5, a cross-sectional shape of each pipe member 29 is noncircular (substantially elliptic) and a vertical dimension of the pipe member 29 is formed to be greater than a vertical opening dimension of the opening 25A. The vertical dimension of the pipe member 29, however, is formed to be smaller than a distance between an upper surface 25B and a lower surface 25C of the long groove 25. A dimension of the pipe member 29 in a depth direction (Y-axis direction) of the long groove 25 is formed to be greater than a dimension from the mold clamp surface 21 up to a depthwise wall surface 25D of the long groove 25.

Namely, the pipe members 29 are inserted, as shown in FIG. 5(a), so that they are easily movable in the long groove 25 in the longitudinal direction of the long groove 25. The pipe members 29 are inserted in the long groove 25 so that they are unable to escape from the opening 25A, so that they partly protrude from the opening 25A, and so that, as shown in FIG. 5(b), their turnings around an axial center in the long groove 25 are restricted. As mentioned above, the slit 29S of each pipe member 29 inserted in the long groove 25 is positioned to face the upper surface 25B, the lower surface 25C, or the depthwise wall surface 25D of the long groove 25.

Figure 6:
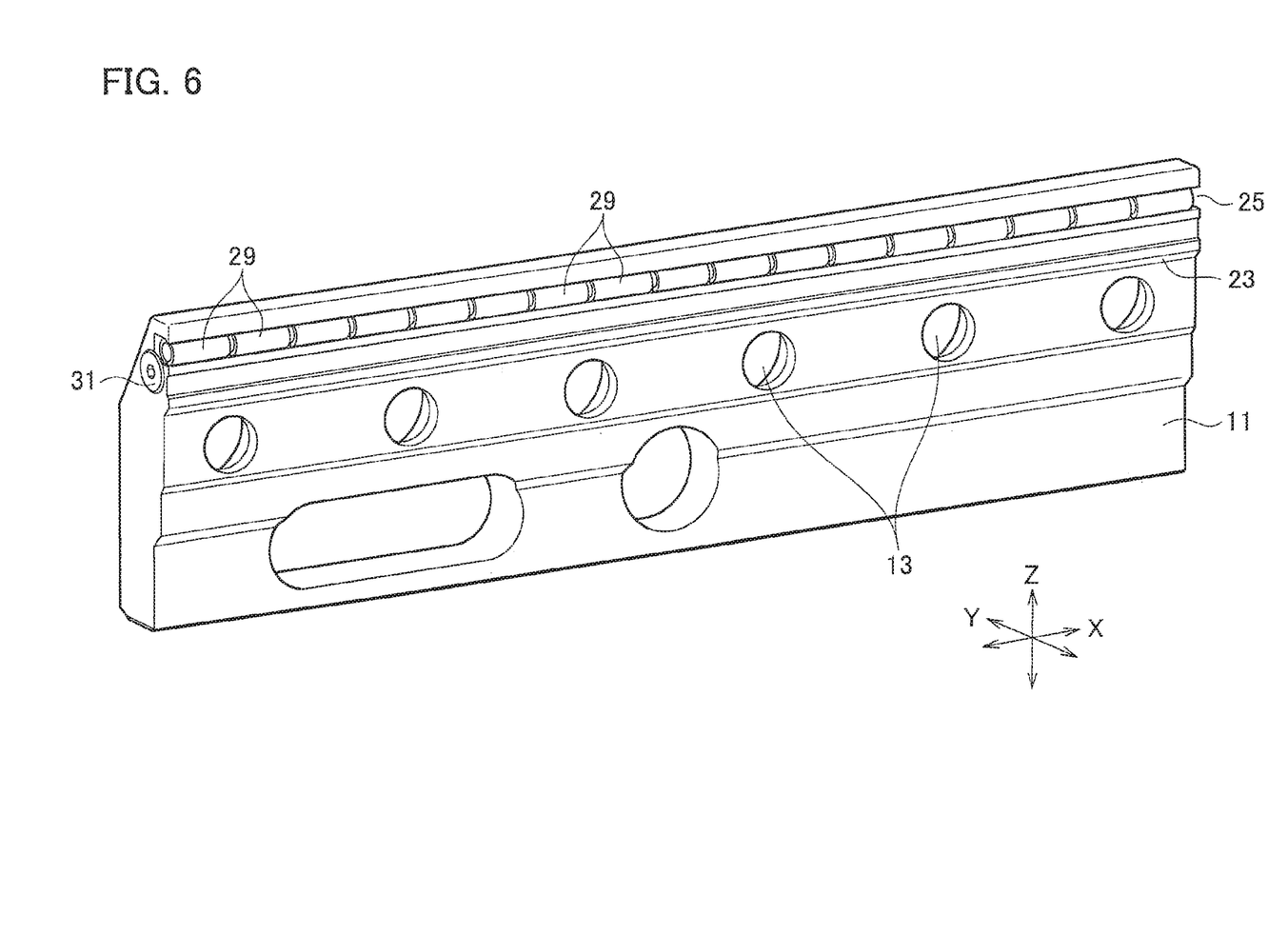
FIG. 6 is a perspective explanatory diagram showing the mold clamp.

On an X-axis end surface of the mold clamp 11, a stopper 31 (refer to FIGS. 3 and 6) is arranged to prevent the pipe members 29 from coming off the long groove 25.

Figure 3:
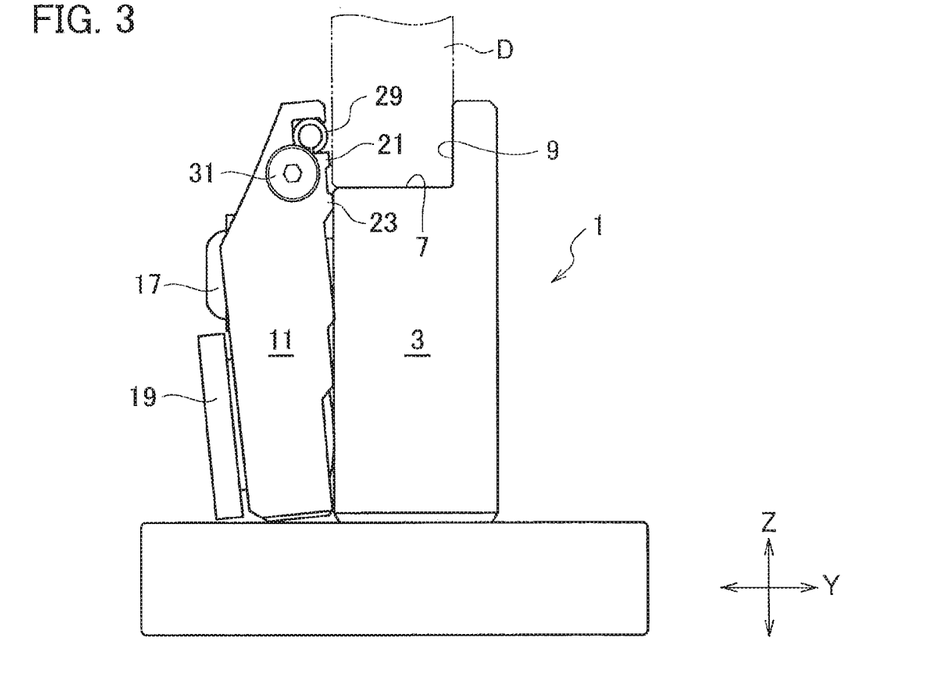
FIG. 3 is a side diagram showing the mold holder device of a state in which a gap between a mold contacting surface and a mold clamp is opened.

In the above-mentioned structure, as shown in FIG. 3, when the mold contacting surface 9 of the holder body 3 and the mold clamp surface 21 of the mold clamp 11 are spaced away from each other, the lower mold D is placed and positioned on the mold supporting surface 7 of the holder body 3. Thereafter, the pushing screw member 19 arranged on the mold clamp 11 is screwed relative to the mold clamp 11 to push the front surface 3F of the holder body 3, thereby turning the mold clamp 11 in a clockwise direction in FIGS. 2 and 3. As a result, the mold clamp surface 21 of the mold clamp 11 pushes, holds, and fixes the lower mold D with respect to the mold clamp surface 21.

At this time, the pipe members 29 provided for the mold clamp 11 elastically deform to supplementarily push the lower mold D to the mold contacting surface 9. Namely, when clamping the lower mold D by the mold clamp surface 21 of the mold clamp 11 with respect to the mold contacting surface 9 of the mold holder 3, the pipe members 29 supplementarily act to clamp the lower mold D. Accordingly, if the lower mold D is split, the split molds are clamped under an equal pushing force.

Here, the pipe members 29 are made of metal such as spring steel having a large elastic coefficient. Accordingly, even a slight elastic deformation of the pipe members 29 provides a large pushing force (clamping force). Even if the lower mold D is split, the split molds will surely strongly be pushed and fixed.

In the above-mentioned structure, if the pushing screw 19 is further screwed, the fulcrum protrusion 23 of the mold clamp 11 tends to move away from the front surface 3F of the holder body 3. In this case, the pivot fulcrum around which the mold clamp 11 pivots clockwise in FIGS. 2 and 3 moves to the mold clamp surface 21 of the mold clamp 11. When the mold clamp surface 21 of the mold clamp 11 clamps the lower mold D with respect to the mold contacting surface 9, the pipe members 29 elastically deform to supplementarily clamp the lower mold D. As a result, if the lower mold D is split, the split molds will evenly be pushed and fixed.

As mentioned above, if the fulcrum protrusion 23 of the mold clamp 11 starts to move away from the front surface 3F of the holder body 3, each resilient member 18 resiliently arranged between the head of the fastening screw 17 and the bottom part 13A of the through hole 13 is more strongly compressed. Accordingly, the clamping of the lower mold D is more strongly carried out.

The above-mentioned structure employs a plurality of the mold clamps 11, and therefore, it is possible to release the pushing and fixing by one mold clamp 11 corresponding to a replacement required lower mold D and replace the lower mold D with another.

In the above mentioned explanation, the mold holder device 1 handles the lower mold D. The present invention is also applicable, as shown in FIG. 7, to a mold holder device 1A that handles an upper mold P.

Figure 7:
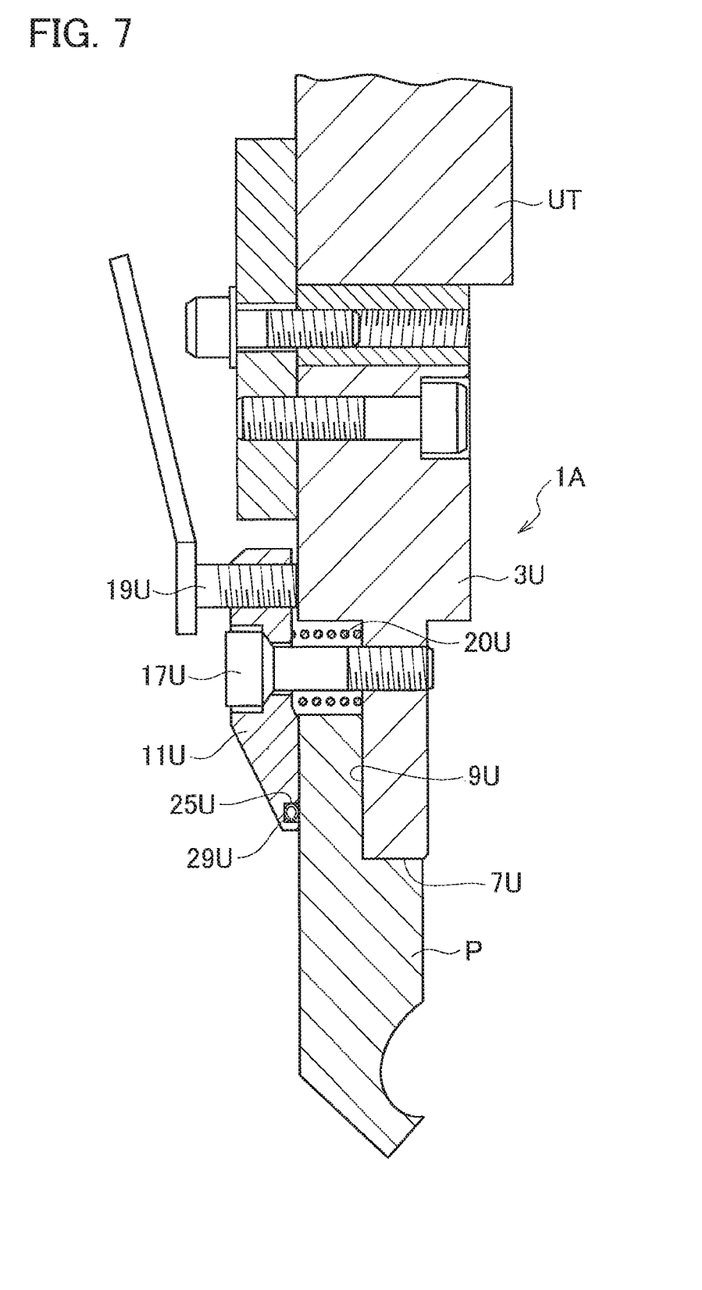
FIG. 7 is a sectional explanatory diagram showing a constitution of a mold holder device for an upper mold.

A general configuration of the mold holder device 1A shown in FIG. 7 is a well-known one. Even so, for the sake of easy understanding, the general configuration will schematically be explained. In FIG. 7, corresponding to the lower table T is an upper table UT having an upper holder body 3U that corresponds to the holder body 3 and is detachably attached to a bottom surface of the upper table UT. A mold supporting surface 7U corresponding to the mold supporting surface 7 of the holder body 3 and a mold contacting surface 9U corresponding to the mold contacting surface 9 are arranged on the upper holder body 3U.

Further, the mold holder device 1A rotatably (pivotably) supports a mold clamp 11U corresponding to the mold clamp 11 with a fastening screw 17U corresponding to the fastening screw 17. The mold clamp 11U is provided with a pushing screw member 19U corresponding to the pushing screw member 19. A part of the fastening screw 17U is provided with a resilient member 20U to push the mold clamp 11U to a contact part of the fastening screw 17U. A front end side of the mold clamp 11U is provided with a long groove 25U corresponding to the long groove 25. In the long groove 25U, a plurality of pipe members 29U corresponding to the pipe members 29 are arranged.

Accordingly, the mold holder device 1A for the upper mold P is able to provide effects similar to the mold holder device.

INDUSTRIAL APPLICABILITY

In accordance with the present invention, peripheral surfaces of metal pipe members inserted in a long groove of a mold clamp supplementarily push and fix a mold with respect to a mold contacting surface of a holder body. Accordingly, a plurality of molds can evenly be pushed and fixed.

The invention claimed is:

1. A mold holder device in a press brake comprising:
a mold clamp that clamps split molds arranged adjacent to each other with respect to a mold contacting surface provided on a holder body of the mold holder device, the mold clamp being pivotally arranged on the holder body;
a groove formed in a mold clamping surface with which the mold clamp clamps the split molds arranged adjacent to each other with respect to the mold contacting surface, the groove being parallel to a pivot axis of the mold clamp; and
metal pipe members having a longitudinal slit and being inserted in a rotation restricted state into the groove, a part of an outer peripheral surface of the pipe members being protruded toward the mold contacting surface, when clamping each of the split molds by the mold clamping surface with respect to the mold contacting surface, each of the pipe members elastically being deformed to supplementarily push each of the split molds to the mold contacting surface, wherein
on an end surface of the mold clamp in a longitudinal direction of the mold clamp, a stopper is arranged to prevent the pipe members from moving out of the groove in a longitudinal direction of the groove.

2. The mold holder device according to claim 1, wherein a pivot fulcrum serving as a pivot center when the mold clamp clamps the split molds is arranged at a position where the mold clamp faces a front upper part of the holder body, and a second pivot fulcrum serving as a second pivot center is arranged on the mold clamping surface of the mold clamp.

3. The mold holder device according to claim 2, wherein the groove has an opening on the mold clamping surface, a vertical dimension of the pipe members arranged in the groove is greater than a vertical dimension of the opening, and a groove-depthwise dimension of the pipe members is greater than a dimension from the mold clamping surface of the mold clamp up to a depthwise wall surface of the groove.

4. The mold holder device according to claim 2, wherein a sectional shape of the pipe members is noncircular and the slit of the pipe members in the groove is positioned to face an upper surface, a lower surface, or a depthwise wall surface of the groove.

5. The mold holder device according to claim 1, wherein the groove has an opening on the mold clamping surface, a vertical dimension of the pipe members arranged in the groove is greater than a vertical dimension of the opening, a groove-depthwise dimension of the pipe members is greater than a dimension from the mold clamping surface of the mold clamp up to a depthwise wall surface of the groove, and a sectional shape of the pipe members is elliptic.

6. The mold holder device according to claim 5, wherein a sectional shape of the pipe members is noncircular and the slit of the pipe members in the groove is positioned to face an upper surface, a lower surface, or a depthwise wall surface of the groove.

7. The mold holder device according to claim 1, wherein a sectional shape of the pipe members is noncircular and the slit of the pipe members in the groove is positioned to face an upper surface, a lower surface, or a depthwise wall surface of the groove.

8. The mold holder device according to claim 1, wherein the groove extends through an entire length of the mold clamp.

9. The mold holder device according to claim 1, wherein the pipe members are movable in the groove in the longitudinal direction of the groove.

* * * * *